United States Patent [19]
Jabsen

[11] 3,933,583
[45] Jan. 20, 1976

[54] NUCLEAR FUEL ROD FRAME WITH FUEL RODS POSITIONED BY MOVEABLE MEMBER

[75] Inventor: Felix Stanley Jabsen, Lynchburg, Va.

[73] Assignee: The Babcock & Wilcox Company, New York, N.Y.

[22] Filed: Jan. 11, 1971

[21] Appl. No.: 105,388

Related U.S. Application Data

[62] Division of Ser. No. 774,148, Nov. 7, 1968, Pat. No. 3,665,586.

[52] U.S. Cl. ................................................. 176/78
[51] Int. Cl.² ........................................... G21C 3/34
[58] Field of Search ............. 176/78, 76, 87; 81/3.7; 29/225, 230, 428, 469, 433, 437, 449, 453; 285/319

[56] References Cited
UNITED STATES PATENTS

| | | | |
|---|---|---|---|
| 3,431,171 | 3/1969 | Glaudin | 176/78 |
| 3,604,100 | 9/1971 | Tindale | 176/78 X |

*Primary Examiner*—Harvey E. Behrend
*Assistant Examiner*—Salvatore Cangialosi
*Attorney, Agent, or Firm*—J. M. Maguire, Esq.; J. P. Sinnott, Esq.

[57] ABSTRACT

A grid structure for holding a plurality of nuclear fuel rods. The grid structure is of the type having wall means, including rigidly interconnected generally rectangular metal strips, forming a plurality of passageways and adapted to support nuclear fuel rods within some of the passageways. The improvement comprises providing elongated slots intermediate and normal to the longitudinal edges of each of the strips at each intersection of the strips whereby the slots form openings in each corner of each passageway.

2 Claims, 12 Drawing Figures

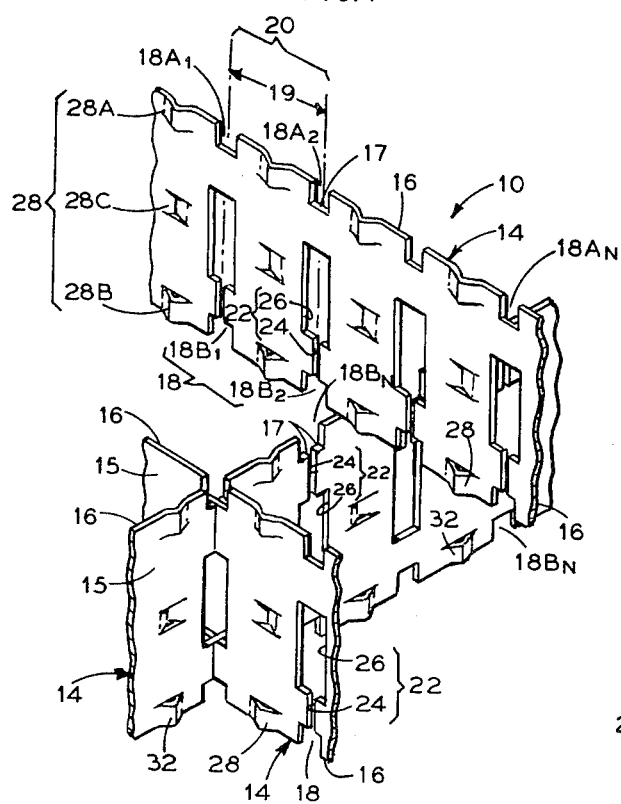
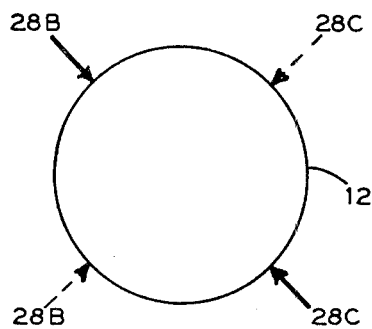
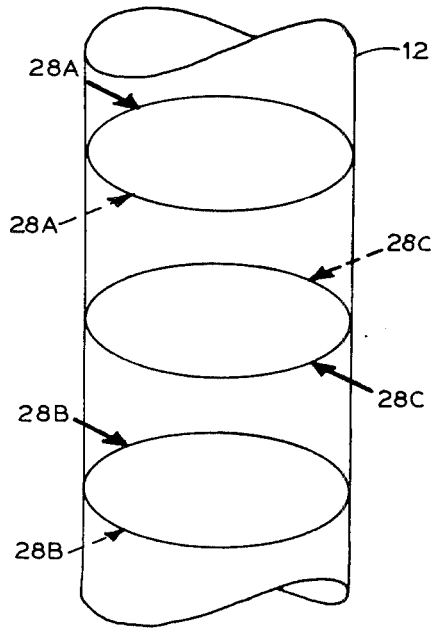
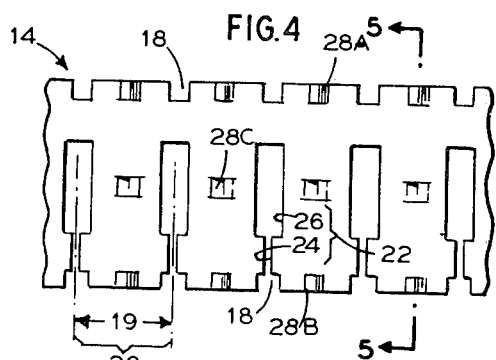
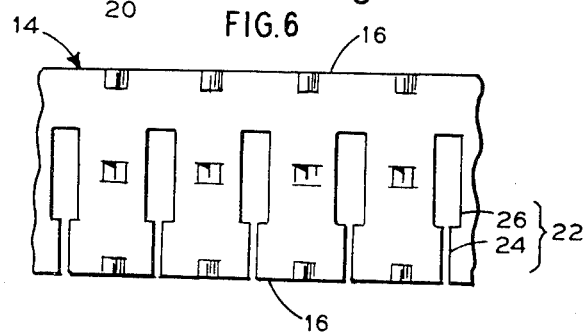
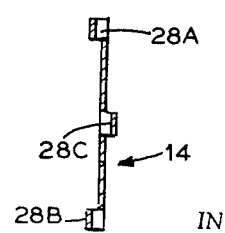
INVENTOR.
Felix S. Jabsen
BY
ATTORNEY

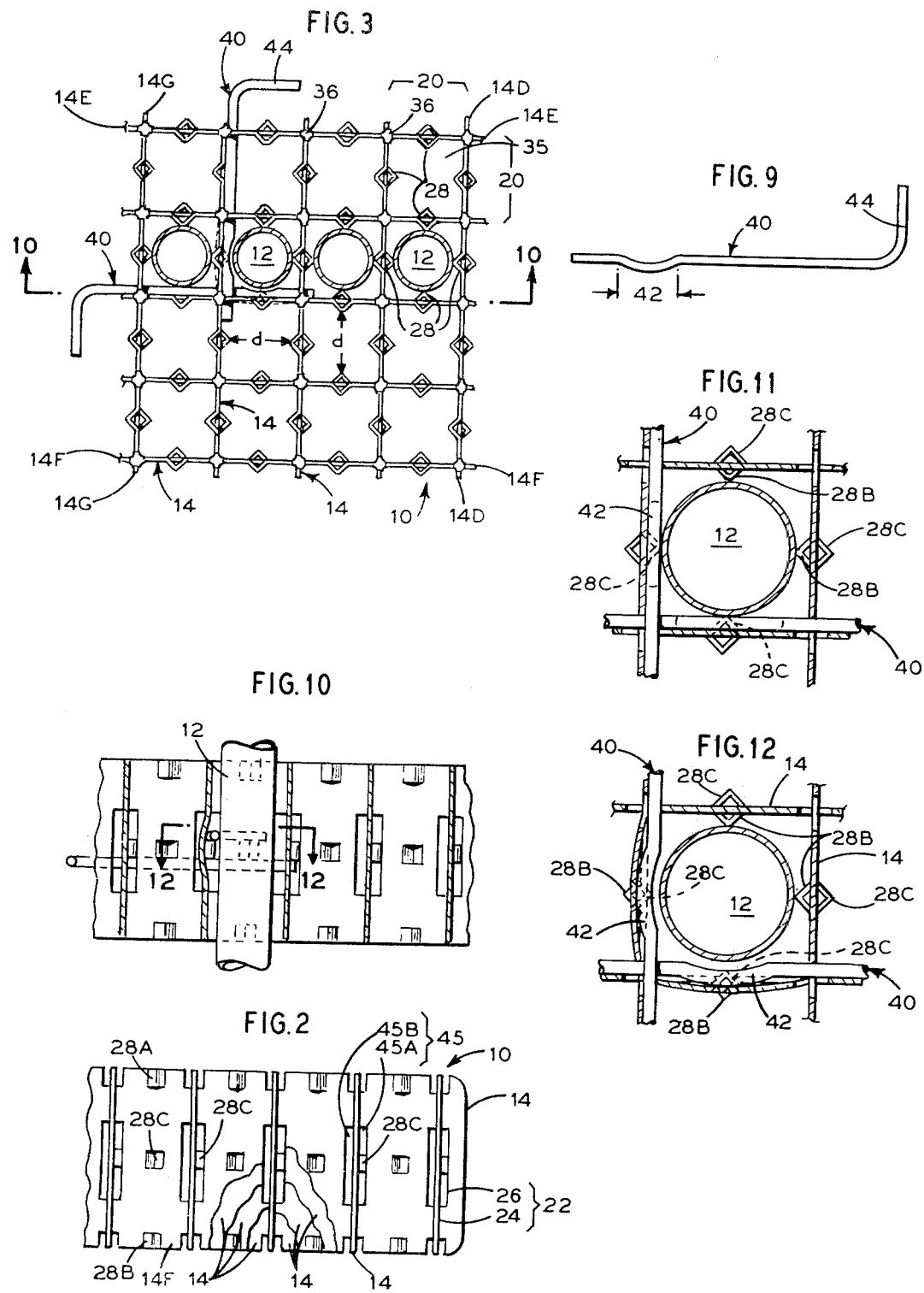

NUCLEAR FUEL ROD FRAME WITH FUEL RODS POSITIONED BY MOVEABLE MEMBER

This is a division of application Ser. No. 774,148, filed Nov. 7, 1968, now U.S. Pat. No. 3,665,586.

A nuclear chain reaction is obtained by bombarding fissionable fuel material with neutrons from a source of neutrons to split some of the atomic nuclei of the fuel into fragments, thereby releasing useful energy in the form of heat and other neutrons for bombarding other nuclei, and so on, ad infinitum, so long as each fuel nucleus undergoing fragmentation produces a minimum of one neutron on the average which in turn fragments another fuel nucleus. The process, called fission, depends for its continuity on an adequate supply of neutrons and fuel. To control the reaction, devices having large neutron absorption cross-sections are generally utilized in conjunction with a moderating material for slowing down neutrons so that they possess the desired energy spectrum. The fuel, neutron absorbing material and moderator, together with associated structural components make up the core of the reactor, through which a heat transfer fluid is circulated to remove heat generated by the fission process.

The present invention is concerned with the associated structural components of the core, in that it is concerned with apparatus for spacing and supporting nuclear fuel bearing members in an upright position within the core.

To achieve optimum power distribution across the core, consideration must be given to the shape and distribution of the fuel bearing members. Since the heat generated by the fuel is more efficiently dissipated from the area surrounding the fuel when the fuel bearing member has a high ratio of surface area to volume, modern day reactors utilize a plurality of slender elongated fuel members or rods which are each made of a length of fuel material enclosed in a relatively thin-walled circular tube of cladding material. A number of fuel rods are clustered together in a composite assembly known as a fuel element, whereas a plurality of fuel elements make up the core. Due to their slender construction, whatever means is used to space and position the fuel rods relative to one another must have good mechanical stability as well as the ability to compensate for the slight differences in cross-sectional dimension of the individual fuel rods due to manufacturing tolerances. In addition, to expose the greatest possible surface area of a given rod to coolant flow; contact between the supporting structure and the rod, and obstructions to coolant flow around the rods, should be minimized.

To answer these needs, a variety of grid-like fuel rod spacing and supporting arrangements have been developed. For example. U.S. Pat. No. 3,225,090 issued to R. M. Leirvik, June 7, 1966, describes a fuel element spacer grid having a plurality of open-ended tubular supporting sections adapted to have fuel rods inserted therein. In a preferred embodiment, each tubular section has an indentation formed in each of its resilient side walls. The indentations extend towards the axis of the section to grip the fuel rod therewithin and firmly hold it in place. Primary coolant freely bathes the region of the fuel rod which is surrounded by the walls of the section, since an elongated annular flow space exists between the rod and walls except at the points where the rod is contacted by the indentations. Since the walls are resilient, they compensate for slight variations in diameter of the fuel rods and laterally impress forces on the fuel rods of sufficient magnitude to support the rods in an upright position within the core.

To assemble such prior art devices a fuel rod is either pushed or pulled through and into position within its respective spacer grid section. The fuel rod itself is used to deflect a resilient means such as the resilient walls of Leirvik's tubular sections, resilient projections extending from rigid walls, resilient indentations or like resilient movable fuel rod gripping members out of the passageway formed by the spacer grid arrangement to allow passage of the rod therethrough and into position therewithin. Forces of up to 400 lbs. may be required to force a fuel rod into position within the grid. Since highly specialized and elaborate loading equipment is usually required to position the rods within the grids, fuel elements are usually shop-assembled and shipped as units to the reactor site. The assembly process is not only time consuming and costly but results in fretting the fuel rod cladding, thereby affecting the integrity of the fuel rods.

Accordingly, there has been a long felt need for a more simplified grid structure which can be readily loaded with fuel rods at the reactor site without employing elaborate equipment, and a process for assembling fuel rods with grids which eliminates the fuel rod fretting problem. The present invention provides a simply constructed spacer grid having resilient holding means and provision for deflecting the holding means out of the path of the fuel rod while the rod is being moved within the passageway formed by the grid, such deflection being required whenever fuel rods are either being loaded into the grid or unloaded from the grid. The arrangement eliminates both the fretting problem and the need for providing elaborate assembly equipment.

Accordingly, the invention is provided in combination with a frame for holding a movable nuclear fuel bearing member in place within a nuclear reactor wherein the frame comprises at least one open-ended cell which forms passageway within which the member may be held and resilient means for holding the member within the passageway and is an improvement comprising means other than the member for temporarily enlarging the passageway to enable the member to be freely moved within the passageway. The preferred enlarging means comprises a means for temporarily deflecting the resilient means associated with the cellular structure. In greater detail, a plurality of rectangularly shaped panels are provided to form the aforementioned cell. Preferably, at least one of the panels acts as the resilient means and has a portion thereof formed to extend inwardly of the axis of the pasageway to hinder motion of the fuel bearing member within the passageway, and the deflecting means is actuatable to move the panel portion outwardly of the axis of the passageway to enlarge the same thereby enabling the fuel bearing member to be moved within the passageway without hindrance. The deflecting means is preferably at least one rotatable elongated element which is endwise insertable within the cell and rotatable in place therewithin to deflect the resilient wall, after which it may be again rotated and removed.

The invention also provides a method of assembling a nuclear fuel rod within a grid structure of the type which has resilient means for firmly supporting the fuel rod within a nuclear reactor, wherein the improvement comprises, temporarily deflecting the resilient means to allow the fuel rod to be moved within the grid structure without fretting or marring the fuel rod cladding. It should be appreciated that the method preferably includes the steps of deflecting the resilient means to move the rod into a predetermined position within the grid structure without its being fretted thereby, and then releasing the resilient means to allow it to return and firmly hold the rod in position. Assuming a rod is already in position within the grid structure the method includes the steps of deflecting the resilient means, removing the rod, and releasing the resilient means; or deflecting the resilient means, removing the rod, moving another rod into position, and then releasing the resilient means.

BRIEF DESCRIPTION OF THE DRAWINGS

FIG. 1 is a partially exploded isometric view of a representative portion of a grid structure according to the invention, showing an intermediate stage of assembly of a plurality of grid members;

FIG. 2 is a side elevation view of an assembled portion of a grid structure;

FIG. 3 is a plan view of a representative portion of an assembled grid structure with fuel rods and deflecting elements added;

FIG. 4 is a side elevation of a representative portion of a grid member according to the invention;

FIG. 5 is a sectional view of the grid member of FIG. 4, taken substantially along the line 5—5 of FIG. 4.

FIG. 6 is a side elevation of a representative portion of another grid member according to the invention;

FIG. 7 is a pictorial side elevation of a fuel rod, showing an idealized arrangement of the forces laterally imposed on a fuel rod by the grid structure of FIG. 3 to support the rod in an upright position therewithin.

FIG. 8 is a plan view of FIG. 7;

FIG. 9 is a view of a typical deflecting means according to the invention;

FIG. 10 is a partial side elevation view of the grid structure of FIG. 1 showing a fuel rod and deflecting means in place therewithin taken substantially along the line 10—10 of FIG. 3;

FIG. 11 is an enlarged portion of FIG. 3 illustrating the position of the deflecting means within a cell and before rotation thereof; and FIG. 12 is a view similar to FIG. 11 illustrating the position of the deflecting means after rotation thereof, taken substantially along the line 12—12 of FIG. 10.

DESCRIPTION OF THE PREFERRED EMBODIMENTS

Referring now to the drawings wherein like reference numerals designate like or corresponding parts throughout the several views, there is shown in FIGS. 1-3 a fuel element spacer grid 10 for supporting a plurality of nuclear reactor fuel bearing rods 12 in spaced parallel relationship with respect to one another. The fuel element spacer grid 10 is a multicellular metal frame composed of a plurality of substantially flat elongated members 14 which are made from a weldable and somewhat resilient metal that is able to survive containment within a nuclear reactor without significant alteration of its characteristic of resiliency. The fuel bearing rods 12 are made of a nuclear fuel material encapsulated in a thin-walled slender elongated sheath of a metal cladding which has a coefficient of expansion that is substantially the same as that of the metal of which the frame is constructed thereby eliminating differential thermal expansion between the frame 10 and fuel rods 12 to eliminate a common cause of fretting and/or scratching the rod cladding and/or damaging the frame during normal reactor operation.

In the preferred embodiment (FIGS. 4 and 5), each of the grid members 14 is of the same construction to facilitate fabrication of the frame. The preferred grid member 14 is a strip or band of metal having opposing longitudinally extending faces and edges respectively designated 15 and 16. A plurality of small like-dimensioned slots 18, formed in each of the edges 16, are substantially equidistantly spaced apart from one another along each of the edges 16, each slot in each edge recessing a portion 17 of the edge 16 of the member and being located directly opposite a corresponding slot in the opposite edge. For example, slot $18A_1$ is located directly opposite slot $18B_1$, whereas slot $18A_2$ is located opposite slot $18B_2$, and so on, each slot $18A_n$ being located opposite a corresponding slot $18B_n$, where $n$ is an integer. To simplify the discussion, any portion of the grid member 14 which is bounded by centerlines 19 drawn through adjacent pairs of opposing slots $18A_n - 18B_n$ and $18A_{n+1} - 18B_{n+1}$, where $n$ is a particular integer, will hereinafter be referred to as panel 20. A grid member 14 may thus be described as being made up of a string of generally rectangularly shaped panels 20.

In addition to the slots hereinbefore described, a string of like-dimensioned and substantially equidistantly spaced paddle-shaped cutouts 22 are provided longitudinally of the length of the grid member 14. The number of cutouts provided is equal to the number of pairs of opposing slots $18A_n - 18B_n$ provided. Preferably, each cutout is axially aligned with one of the aforesaid centerlines 19 and includes a narrow slit 24 which extends from the recessed portion 17 of slot 18 towards the longitudinally extending axis of the grid member 14 where it is terminated by a symmetrically shaped opening 26 whose axis is preferably coincident with that of the grid member. As will hereinafter be described in greater detail, the slits 24 act as a means for interlocking a given grid member with at least one other grid member, the slots 18 provide a recess within which weld metal is deposited after interlocking the grid members, and the openings 26 serve as access openings into an assembled multicellular spacer grid 10.

The preferred grid member 14 is also provided with a plurality of indentations 28 formed therein at spaced intervals throughout its length and breadth such that each panel 20 is provided with three indentations 28 aligned with one another and equidistantly spaced apart from one another on a centerline drawn through the panel parallel to the aforementioned centerlines 19. As shown in FIG. 1, each indentation angularly projects a localized portion of the grid member 14 laterally of its length and breadth. Preferably, two of the indentations 28A and 28B in a given panel 20, each project a portion of one of the free opposing edges 16 of the panel in one direction of the length and breadth of the panel, and the other indentation 28C locally projects the center of the panel in the opposite direction. The projections are themselves rigid as compared to the resiliency of the grid member and relatively stiff panels. The peak 32 of each projection 28 describes a line segment oriented perpendicular to the longitudinally extending axis of the grid member 14. As hereinbefore indicated the grid members are formed from a resilient strip of metal. In the preferred embodiment, a grid member is considered to have sufficient resiliency if at least one of its panels 20 will freely return to its previous shape after its center is flexed relative to the edges of the grid member and in the direction of projection of indentations 28A and 28B of the same panel.

A plurality of grid members 14 as hereinbefore described are preferably assembled as shown in FIG. 1-3. As best shown in FIG. 1, any two grid members are interlocked with one another by facewise orienting them at right angles with respect to one another such that the edges of the members having slits 24 extending from slots 18 are similarly oriented and adjacent to one another; aligning one of the centerlines 19 drawn through a pair of opposing slots in one member, with a like centerline in the other member; and endwise moving the members toward one another while they are so oriented and aligned until the opposing edges 16 of the members 14 lie in opposing parallel planes. Upon interlocking the members it is seen that a slot 18A in one member is superjacent a slot 18B in the other member, the spaces defined thereby intersecting one another at right angles to define opposing recesses having bases defined by intersecting recessed portions 17 of the edges 16 of each member 14. A plurality of grid members may be simultaneously interlocked with one another in the same manner without departing from the spirit and scope of the invention. In any event, additional grid members may be added to previously interlocked members in the same manner to form a grid structure 10 having at least one cell 35 and preferably a plurality of cells 35 formed by a plurality of panels 20, wherein each of the panels 20 acts as a side of at least one cell 35, and at least one indentation 28 in each panel 20 projects inwardly of a cell. The grid structure thus formed comprises a plurality of open-ended cells 35 arranged in parallel rows to define a rectangularly shaped array of cells terminated by outer grid members 14D, 14E, 14F, and 14G. To complete the assembly of grid structure 10, a bead of weld metal 36 is locally deposited in each of the recesses to rigidly join the edges 16 of the members together. More particularly, the bead 36 is deposited in each of the recesses to join only the intersecting portions 17 of the edges 16 together.

In another embodiment of the invention, assuming all other particulars remain the same, the slots 18 may be eliminated and only the paddle shaped cutouts 22 and indentations 28 provided in each of the grid members 14. As shown in FIG. 6, the slits 24 would then be extended to an edge 16 of the member 14. Assembly of the grid structure 10 would be accomplished in the same manner, terminating in the step of locally depositing weld metal on the edges 16 of the members at their points of intersection with one another to rigidly join the members together.

As shown in FIG. 3, a typical fuel rod 12 is supported in place in a predetermined position within its respective cell by a plurality of indentations, the lateral forces imposed on a given fuel rod by opposing panels 20 via their indentations 28 being sufficient to support the rod in place and in an upright position within the cell. In either of the embodiments there are six indentations 28 projecting inwardly of each cell 35. The indentations formed in each pair of parallel spaced opposing panels of a given cell 35 provide three projections extending inwardly of the cell. These indentations are equidistantly spaced apart from one another along the longitudinal length of the cell, one of the opposing panels providing two of the projections and the other providing one projection. Accordingly, two panels of a given cell each provide a single projection extending inwardly of the same cell. Because of this arrangement, the panels providing the same number of projections in the given cell are located at right angles and adjacent to one another rather than being located parallel and opposite to one another.

In FIG. 3, the inwardly extending indentations of the cells are referred to a common plane. In the embodiment shown, the minimum transverse dimension $d$ of an elongated straight passageway defined by the panels of a given cell and extending endwise of the cell, is defined by the shortest straight line that can be drawn through the axis of the cell and between indentations of opposing panels as referred to the common plane. An elongated straight fuel rod having a minimum transverse dimension slightly greater than the dimension $d$ cannot be moved endwise through a cell and positioned therewithin unless the minimum transverse dimension of the passageway is enlarged. In prior art devices an end of the fuel rod is inserted within a cell and used as a wedge or lever to force one or more resilient members such one or more as resilient panels, resilient panels having projections, resilient projections, resilient indentations, or like resilient movable fuel rod gripping means outwardly of the axis of the cell to enlarge the passageway therethrough to permit the passage of an end of the rod through the cell for positioning the rod therewithin. As a consequence, the finely finished exterior surface of the fuel rods are fretted, scored, scratched, grooved or otherwise marred by the resilient means as the rods are forcibly moved into a predetermined position within their respective cells. The rods are thereafter additionally fretted, scored, etc., when removed from their respective cells. Accordingly, it is a feature of the invention to provide means for temporarily enlarging the passageway to enable the rod to be freely moved within the passageway thereby eliminating the fretting problem, the enlarging means being a means other than the fuel rod.

In the preferred embodiments hereinbefore described in detail, all of the panels act as resilient holding means for at least one fuel rod except the strings of panels making up two of the outside grid members (members 14D and 14E) since projections 28C of these members project outwardly of the grid structure 10. However, only two of the panels of a given cell act as resilient holding means for the fuel rod associated with any particular cell, i.e., the adjacent panels which each have a single indentation 28C protruding inwardly of a particularly cell. Each of the panels which has a single indentation protruding inwardly of a particular cell laterally forces the fuel rod contacted thereby towards its opposing panel and jams it against the indentations 28A and 28B thereof which protrude into the same cell. Indentations 28A and 28B are not intended to be movable. The edges 16 of the grid members 14 are rigidly connected to one another at their points of intersection and the indentations 28A and 28B are themselves rigid projections. As hereinbefore indicated, the central portion of a given panel is resiliently movable with respect to the edges 16 of the grid member 14 and is movable outwardly of the cell with which indentation 28C is associated and in the direction of projection of the other indentations of the same panel. When moved, the center of the panel carries the rigid centrally located indentation 28C therewith to enlarge the passageway from which the peak 32 of the indentation 28C is withdrawn. If the central portions of both panels having single indentation protruding inwardly of the same cell are both deflected outwardly of the cell, the passageway is enlarged to a greater extent than if only one of the panels is so deflected. Accordingly, the means for temporarily enlarging the passageway when desired comprises; deflecting means for moving the resilient fuel rod gripping means outwardly of the axis of the cell. The deflecting means preferably includes a means for actuating the deflecting means, but this feature is not essential.

Assuming a fuel rod is to be positioned within a cell, the deflecting means is actuated to temporarily outwardly deflect the panels having a single indentation protruding inwardly of the cell, to allow the rod to be freely moved within the cell's passageway by means well known in the art. The panels need only be deflected an amount necessary to permit the requisite portion of the fuel rod to be freely passed through the passageway for proper positioning therein. The word "freely", as used in this disclosure, characterizes the movement of a fuel rod within its respective cell or passageway and is intended to describe movement "without restraint", "without hindrance" or "without restriction" within the cell or passageway; or "without interplay" between the fuel rod and resilient means when the rod is moved within the cell, i.e., when it is either moved into position within the cell or passageway or removed therefrom. When the rod is so freely moved, it might possibly be moved without even being contacted by the indentations 28A, 28B and 28C. In any event, movement of the rod is accomplished without freeting the exterior surface of the rod. After the rod is so positioned within the passageway the deflecting means is actuated to release the resilient means thereby allowing the panels to resiliently return, carry the indentations 28C inwardly of the passageway and laterally jam the fuel rod against indentations 28A and 28B in the opposing panels. Assuming a rod is to be removed from a cell, the procedure is the same; the panels are deflected, the rod removed, and the panels released.

Assuming a rod is being held within the passageway, the laterally directed forces impressed on the rod by the indentations 28A and 28C to support the rod and retain it in place within the cell, are distributed along the longitudinal length of the rod as shown in FIGS. 7 and 8. For the sake of simplicity the reference numeral identifying each of the forces shown in FIGS. 7 and 8 corresponds to the reference numeral of the indentation which imposes the particular force on the fuel rod. Thus force vectors 28C are each imposed on the fuel rod by a panel via its indentations 28C whereas each pair of force vectors 28A and 28B, located 180° removed from one of the vectors 28C, is imposed on the fuel rod by a panel via its indentations 28A and 28B. It should be noted that the pairs of force vectors 28A and 28B do not oppose one another; they are displaced from one another less than 180°. If the forces 28C are, on the one hand, sufficiently reduced in magnitude, or, on the other hand, entirely eliminated, the fuel rod could be easily moved within the cell. The preferred deflecting means is adapted to so reducing or eliminating forces 28C thereby allowing the fuel rod to be freely moved within the cell without being fretted by the indentations.

As shown in FIG. 9–12, the preferred deflecting means, for the embodiments shown, comprises two elongated elements 40 such as a pair of rigid shafts, rods, bars, tubes or the like, with provision for moving the resilient means of a grid structure having at least one cell to enlarge the fuel rod passageway of the cell, thereby allowing a fuel rod to be freely moved in the passageway without being fretted. Each element 40 has a portion 42 of its length offset from its axis of rotation to act as a cam for moving resilient means, and is terminated at one of its ends with an actuating means 44 which preferably comprises a lever arm extending from the element at right angles to its axis. The other end of the element is hereinafter referred to as the free end thereof.

As shown in FIG. 2, when the grid structure is assembled, the openings 26 in the grid members 14 are aligned with one another to define a pair of open channels 45 associated with each grid member and extending longitudinally of the length thereof. Each channel, in a given pair of channels extends through the grid structure parallel to the longitudinally extending axis of the grid member with which it is associated. One channel 45A of each pair of channels 45 is intermittently obstructed throughout its longitudinal length by the centrally located indentations 28C of the grid member with which the channel pair is associated. Only one channel of each pair is so obstructed since all of the centrally located indentations 28C in any given grid member project in the same direction laterally of the length and breadth of the grid member. In order to move a fuel rod within a particular cell the grid members which have a centrally located indentations 28C extending inwardly of that cell must first be identified. Upon identification of each of the particular grid members, channels 45A associated therewith are readily located. The free end of the element 40 is inserted into the grid structure through either of the particular channels 45A so as to position the offset portion 42 of the element in the desired cell. When inserting the element 40, care must be taken to orient the offset portion 42 of the element in a plane approximately parallel to the plane of the grid member associated with the element. The element is inserted into the channel 45A until its offset portion is located next adjacent to the indentation 28C inwardly of the desired cell. The element is then actuated by means well known in the art to cause the element to be rotated one-quarter of a turn either clockwise or counter-clockwise, but in any event, in the direction which carries the passageway, thereby flexing the cell panel having indentation 28C outwardly of the passageway. The positions of the indentation 28C, before and after rotating the element 40, are respectively shown in FIGS. 11 and 12. The same procedure is used to move the other inwardly extending indentation 28C outwardly of the desired cell, another element 40 being inserted into the appropriate channel 45A extending at right angles to the first channel 45A, as shown in FIGS. 11 and 12.

In view of the foregoing it should be appreciated that other multicellular grid structures having resilient means associated therewith may be provided wherein each cell has only one resilient panel for holding the nuclear fuel bearing member therewithin. For example, a given grid structure may have at least one cell formed by three connecting panels, rather than four, to form a triangularly shaped cell with one panel acting as the resilient means for holding a nuclear fuel bearing member therewithin, the resilient panel being adapted to jam the rod against the other panels or protrusions therefrom. In this case, a single deflecting element 40 may be utilized as the deflecting means for enlarging the passageway through the cell. Accordingly, it is a feature of the invention to provide at least one rotatable deflecting element 40 endwise insertable within a grid structure having at least one cell defined by a plurality of panels, wherein only one of the panels of a projection therefrom acts as the resilient means allowing the fuel rod to be freely moved within the passageway defined by the cell. In addition to the foregoing, it should be appreciated that one or more deflecting elements may be provided with a plurality of offset portions 42 distributed along the longitudinal length of the element for simultaneously deflecting the resilient means associated with more than one cell. In this case, the centers of adjacent offset portions may be spaced apart from one another a distance equal to or a multiple of the distance between centers of adjacent panels in the same grid member. Upon rotation of the deflecting element each of the resilient panels with which an offset portion is associated will be deflected outwardly of the cell with which the resilient panel is associated to allow a plurality of fuel bearing members to be freely moved within their respective cells.

What is claimed is:

1. In combination with a frame having resilient means for holding at least one movable nuclear fuel bearing member in place within a nuclear reactor wherein the resilient means is adapted to firmly hold the fuel member in a predetermined position with respect to the frame, the improvement comprising means other than the fuel bearing member for temporarily deflecting the resilient means to enable the fuel bearing member subsequently to be freely moved within the frame, said means further comprising at least one element inserted within the frame and rotatable therewithin and having portions thereon to selectively engage and deflect said resilient means in response to said rotation.

2. The combination according to claim 1 wherein said deflecting means further comprises at least one elongated element inserted within the frame and removable therefrom thereafter, the element being rotatable in place while within the frame to selectively deflect the resilient means.

* * * * *